United States Patent [19]

Gründken et al.

[11] Patent Number: 4,479,575
[45] Date of Patent: Oct. 30, 1984

[54] RETAINING DEVICE

[75] Inventors: Dieter Gründken, Lüen; Reinhold Brüggemann, Dortmund; Horst Linke; Manfred Redder, both of Lünen, all of Fed. Rep. of Germany

[73] Assignee: Gewerkschaft Eisenhutte Westfalia, Lünen, Fed. Rep. of Germany

[21] Appl. No.: 476,580

[22] Filed: Mar. 18, 1983

[30] Foreign Application Priority Data

Mar. 18, 1982 [DE] Fed. Rep. of Germany ... 8207596[U]

[51] Int. Cl.³ ............................................. B65G 19/28
[52] U.S. Cl. .................................... 198/735; 198/861; 403/294; 403/318
[58] Field of Search ......................... 198/735, 861, 860; 403/294, 318, 410, 381, 297, 316

[56] References Cited

U.S. PATENT DOCUMENTS 4,157,751  6/1979  Grundken et al. ................ 198/735
4,158,512  6/1979  Hasselbacher ..................... 403/294

FOREIGN PATENT DOCUMENTS 2754570  6/1979  Fed. Rep. of Germany ...... 198/735
2826023  12/1979  Fed. Rep. of Germany ...... 198/735

Primary Examiner—Andrew V. Kundrat
Attorney, Agent, or Firm—Thompson, Birch, Gauthier & Samuels

[57] ABSTRACT

Connection means for connecting two components such as conveyor channel sections or guide sections includes an elongate connector. The connector is insertible into laterally-open recesses formed in coupling elements attached to the two components. The laterally-open recesses define an elongate aperture which is slightly longer than the connector so that the connector is received within the aperture with a predetermined amount of axial play. A retaining device prevents axial movement of the connector within the aperture by filling up the space available for said predetermined amount of axial play. The retaining device comprises a C-shaped resilient member and a wedge-shaped member. The resilient member is made of corrosion-resistant, resiliently-deformable plastics material, and the wedge-shaped member is made of metal. The wedge-shaped member can be driven into the resilient member to expand the resilient member against the walls of said space, thereby fixing the retaining device in position. The wedge-shaped member is then held captive within the resilient member, thereby maintaining the retaining device in the fixed position.

18 Claims, 5 Drawing Figures

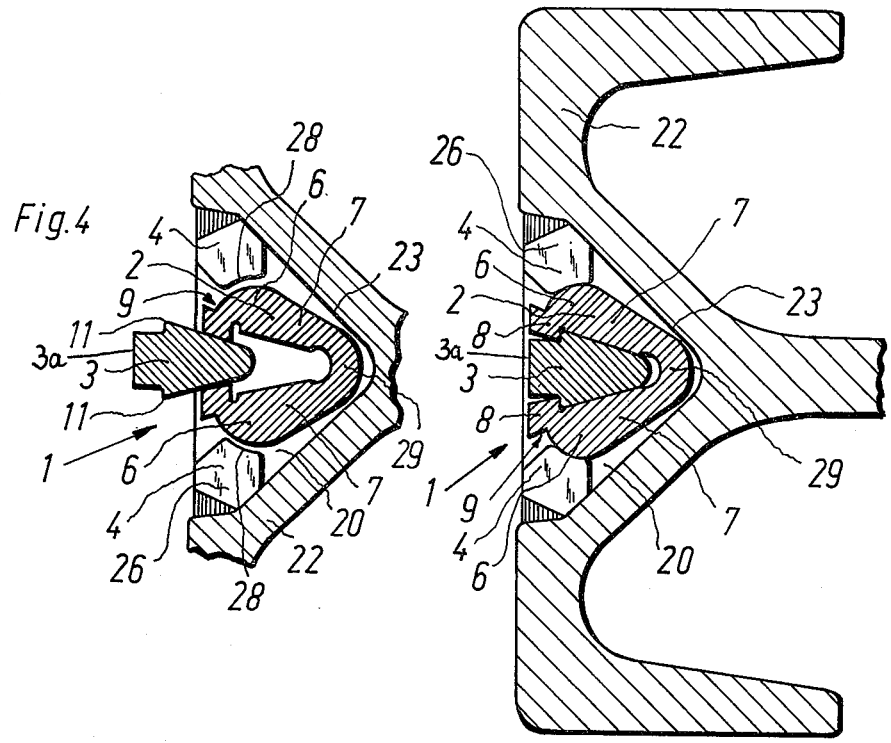
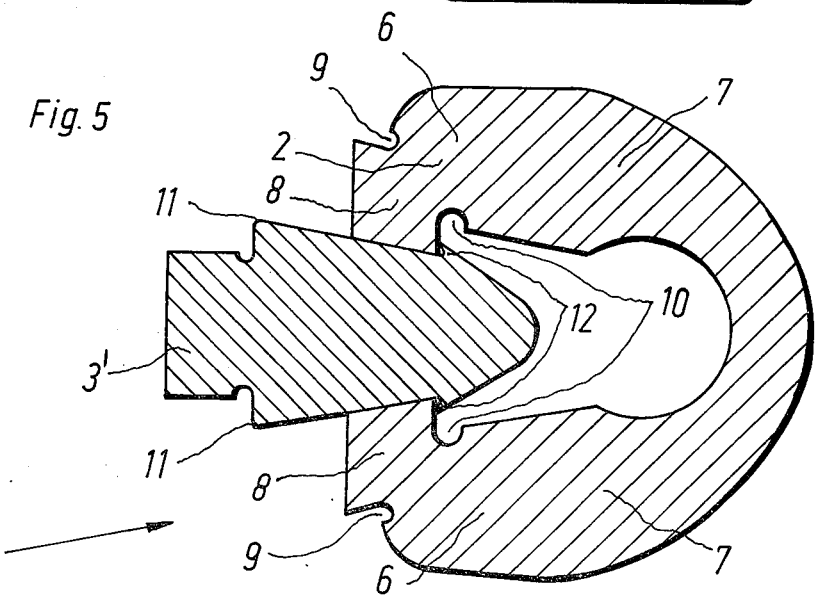

RETAINING DEVICE

BACKGROUND TO THE INVENTION

This invention relates to connection means for connecting adjacent channel sections of a scraper-chain conveyor or adjacent sections of a winning machine guide, and to a retaining device for such connection means.

A variety of devices for connecting the individual channel sections of scraper-chain conveyors are known. Such devices normally resist tensile forces which tend to draw the ends of the channel sections apart, and allow some regular mobility between the channel section ends. The connection devices are often subjected to very high forces during operation, not only the tensile forces which they are designed to resist but also buckling forces tending to displace the conveyor ends laterally and/or vertically. Primarily, the lateral forces occur when the conveyor is shifting up to follow the mineral winning progress. This is usually accomplished by means of rams which shift individual lengths of the conveyor in the so-called "snaking" movement. The vertical forces usually occur when a mining machine supported on the conveyor is moved, for example, along the mineral face. Where the floor of the mine working is uneven, these lateral and vertical forces can increase substantially.

One known form of device for connecting the individual channel sections of a scraper-chain conveyor is constituted by a coupling member in the form of a shank provided at each end with an enlarged head portion. The coupling member is introduced into aligned apertures in coupling elements which are welded onto the channel section ends. The coupling member is received within the aligned apertures with a predetermined amount of axial play. One head portion of the coupling member is provided with an axially-extending fastening member which engages behind a complementary fastening member provided on one of the channel sections. The other head portion of the coupling member is provided with a pair of shoulders which cooperate with complementary recesses provided in the coupling element of the other channel section. The coupling member can be introduced into the apertures obliquely from the side, and is prevented from falling out laterally by the fastening member and the shoulders engaging respectively with said complementary fastening member and said complementary recesses. A retaining element in the form of a metallic C-shaped clip is positioned adjacent to said other head portion of the coupling member to prevent axial movement of the coupling member by filling up the space available for said predetermined amount of axial play. Thus, the coupling member cannot move along the aligned apertures so that its fastening member and shoulders move out of engagement with their respective complementary fasteners. The coupling member is, therefore, safely held in position under all normal load conditions, particularly under the loads imposed by angling of the channel sections. (See DE-OS No. 2 636 527).

Unfortunately, it has been found that resilient clips of this type are subjected to considerable forces in the course of underground mining operations, and these forces may lead to the permanent deformation and damage of the clips. Such damaging forces can arise, for example, when coal dust collects in the pockets that accommodate the clips, the dust becoming relatively firmly briquetted in the pockets, so that the inherent limited degree of play within the pockets is reduced. Moreover, during underground operations, the resilient clips suffer quite considerable corrosion, which affects their operational efficiency, and hence reduces the reliability of the connection means.

Connection means of this type are also used for connecting the sections of a winning machine guide (for example a plough guide) which is built onto the channel sections of a scraper-chain conveyor.

The aim of the invention is to provide a retaining device for connection means of the type described above, the retaining device being easy and inexpensive to manufacture, whilst having greater operational reliability.

SUMMARY OF THE INVENTION

The present invention provides connection means for connecting two components of a mineral mining installation, the connection means comprising an elongate coupling member which is insertible into laterally-open recesses formed in the two components, the laterally-open recesses defining an elongate aperture which is slightly longer than the coupling member so that the coupling member is received within the aperture with a predetermined amount of axial play, a retaining device being provided for preventing axial movement of the coupling member within the aperture by filling up the space available for said predetermined amount of axial play, wherein the retaining device is constituted by a C-shaped resilient member and a wedge-shaped member, the resilient member being made of corrosion-resistant resiliently-deformable material, the retaining device being such that the wedge-shaped member can be driven into the resilient member to expand the resilient member against the walls of said space thereby fixing the retaining device in position, and such that the wedge-shaped member is held captive within the resilient member when the retaining device is fixed in position.

Advantageously, the resilient member is made of plastics material. Thus, resilient members of this type can be manufactured as inexpensive, mass-produced articles by cutting up tubular extrusions. Moreover, because they are cheap, they can be used as simple throw-away parts, so they can be broken open (for example with a chisel) prior to being removed so as to allow the connection means to be released. When broken up, such a resilient member can easily be withdrawn, for example using a pair of pliers. On the other hand, the wedge-shaped member, which is preferably made of metal, can be used several times.

Advantageously, the width of the wedge-shaped member is at least as great as the width of the resilient member. In this connection, the term "width" should be taken to mean the dimension which lies parallel to the axial direction of the coupling member.

Thus, with this retaining device, the considerable compressive forces, which are caused in particular by accumulations of fine coal, are taken up, not by the resilient member, but by the rigid wedge-shaped member.

Advantageously, the resilient member is provided with two symmetrically-positioned, thickened wall portions which engage behind two latching projections provided within the aperture when the retaining device is fixed in position. Preferably, the thickened wall portions are rounded.

To prevent the coupling member from being axially displaced in the direction for release, the resilient member is first introduced into said space. The wedge-shaped member is then forced into the resilient member, so that the resilient member is expanded by the forced-in wedge-shaped member, the thickened wall portions of the resilient member bearing behind the latching projections provided within the said space.

Preferably, the C-shaped resilient member has a pair of symmetrical arms which tightly embrace the wedge-shaped member when the retaining device is fixed in position. Advantageously, inwardly-extending flanges are formed at the free ends of the arms. Conveniently, the wider end of the wedge-shaped member is provided with an axially-extending shank which is narrower than said wider end, thereby defining a pair of shoulders which engage behind the flanges of the arms of the resilient member when the retaining device is fixed in position.

Notches may be formed in the outer surface of the resilient member in the regions where the arms merge with their flanges. At least one notch may also be formed in the inner surface of the resilient member, the or each notch being formed in a region where one of the arms merges with its flange. Preferably the notches are rounded. The notches are provided for facilitating the shearing of the resilient member, which is necessary in order to remove the retaining device. Advantageously, the thickened wall portions of the resilient member are formed in the arms adjacent to the regions which merge with the flange.

In a preferred embodiment, the wedge-shaped member is provided with two symmetrically-positioned hook-like latches which extend laterally beyond the tapering edges of the wedge-shaped member.

The invention also provides connection means for connecting two channel sections of a scraper-chain conveyor, the connection means being as defined above, and the two components being coupling elements welded to the adjacent side walls of the two channel sections.

The invention further provides a retaining device for an elongate coupling member which is insertible into laterally-open recesses formed in two mineral mining installation components to interconnect said components, the laterally-open recesses defining an elongate aperture which is slightly longer than the coupling member so that the coupling member is received within the aperture with a predetermined amount of axial play, the retaining device being such as to prevent axial movement of the coupling member within the aperture by filling up the space available for said predetermined amount of axial play, wherein the retaining device is constituted by a C-shaped resilient member and a wedge-shaped member, the resilient member being made of corrosion-resistant resiliently-deformable material, the retaining device being such that the wedge-shaped member can be driven into the resilient member to expand the resilient member against the walls of said space thereby fixing the retaining device in position, and such that the wedge-shaped member is held captive within the resilient member when the retaining device is fixed in position.

BRIEF DESCRIPTION OF THE DRAWINGS

The invention will now be described in greater detail, by way of example, with reference to the accompanying drawings, in which:

FIG. 3 is a cross-section taken on the line III—III of FIG. 2, and shows one retaining device which is constituted by a resilient member and a wedge-shaped member;

FIG. 4 is a cross-section, similar to that of FIG. 3, showing the wedge-shaped member being driven into the resilient member; and FIG. 5 shows a second form of retaining device, with its wedge-shaped member being driven into its resilient member.

DESCRIPTION OF PREFERRED EMBODIMENTS

Figure 1:
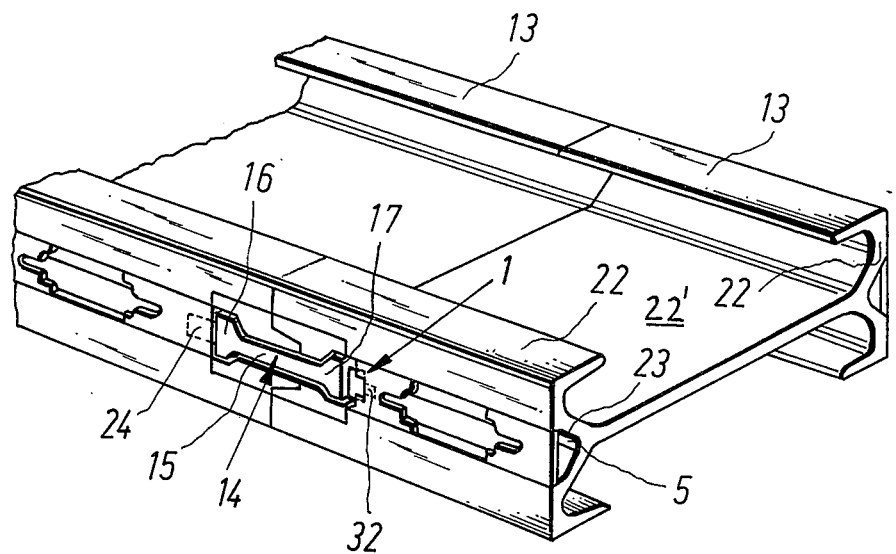
FIG. 1 is a diagrammatic perspective view of the adjacent end portions of two channel sections of a scraper-chain conveyor connected together by connection means incorporating retaining devices constructed in accordance with the invention.

In known manner, a scraper-chain conveyor is constituted by a plurality of channel sections (or pans) arranged end-to-end. FIG. 1 shows the adjoining parts of two such channel sections 13, each of which is constituted by side walls 22 having a generally sigma-shaped cross-section, and a floor plate 22' welded between the V-shaped, recessed central portions 23 of the side walls. The adjacent ends of each pair of adjacent side walls 22 of the two channel sections 13 are connected together by respective connection means (only one of which can be seen in the drawings). Each of these connection means is the same, so only one of them will be described in detail.

Each connection means includes a coupling member 14 and a pair of coupling elements 20 and 21, the coupling elements being welded to the adjacent ends of the side walls 22 within the V-shaped portions 23. The coupling element 20 is formed with a projection which mates, with an all-round clearance, with a recess in the coupling element 21. This ensures that the two channel sections 13 have the required angular mobility. Each of the coupling elements 20 and 21 is formed with a respective laterally-open recess 18 and 19 whose combined outline is adapted to the outer contour of the coupling member 14.

Figure 2:
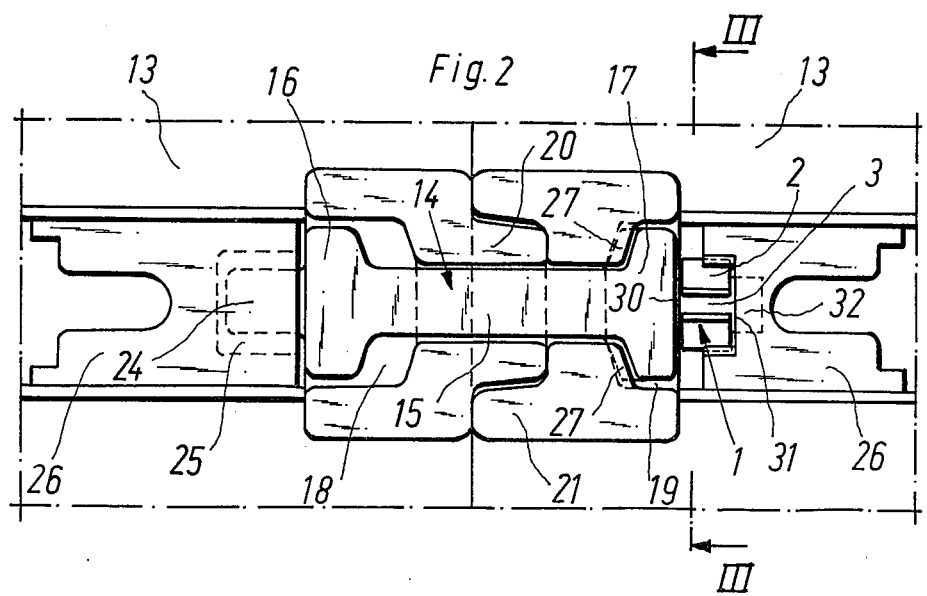
FIG. 2 is a side elevation of the connection means of FIG. 1.

The coupling member 14, which is made as a one-piece casting or forging, comprises a shank 15 provided, at each end thereof, with an enlarged head portion 16 and 17. This type of coupling member is known as a toggle bolt or a dog-bone connector. The coupling member 14 can be inserted into the recesses 18 and 19 to connect the coupling elements 20 and 21 together. An axially-extending fastening member 24 is provided on the head portion 16 of the coupling member 14, the fastening member 24 engaging, in the coupled position, within a recess 25 formed within a holder 26 welded into the V-shaped portion 23 in the left-hand side wall 22 (as seen in FIGS. 1 and 2). A pair of latching recesses 27 are formed on the head portion 17 of the coupling member 14, the latching recesses being formed in the region where the head portion 17 merges with the shank 15. The latching recesses 27 have an axial dimension which is smaller than that of the fastening member 24.

In the coupled position, the latching recesses 27 engage behind complementary shoulders (not shown) formed on the rear surface of the coupling element 21. A holder 26 is also welded into the V-shaped portion 23 in the side wall 22 of the right-hand channel section 13 (as seen in FIGS. 1 and 2).

The connection between the two channel sections 13 is effected in such a manner that the projections on the coupling elements 20 extend into the complementary recesses in the coupling elements 21. Each of the coupling members 14 is subsequently inserted into the respective recesses 18 and 19 obliquely from the side in such a manner that its fastening member 24 engages behind the holder 26 of the left-hand channel section 13 (as seen in FIGS. 1 and 2). Then, by axially displacing the coupling member 14 within the recesses 18 and 19, it is possible to effect positive fastening of the coupling member against the other coupling element 21, the recesses 27 mating with the complementary shoulders on that coupling element. The coupling member 14 is thus prevented from falling sideways out of the recesses 18 and 19.

In order to maintain the coupled condition of the channel sections 13, and to retain the coupling members 14 axially in the coupled position, each of the connection means is provided with a retaining device 1 which is inserted into the V-shaped portion 23 of the side wall 22 of the right-hand channel section 13 (as seen in FIGS. 1 and 2). The retaining devices 1 form stops for the head portions 17 of the coupling members 14, which are thereby prevented from moving axially within the recesses 18 and 19. Each of the retaining devices 1 is positioned between the respective head portion 17 and the respective holder 26.

FIG. 3 shows how a retaining device 1 is seated within the pocket 5 defined by the V-shaped portion 23 of the side wall 22 and the adjacent holder 26. The open side of this pocket 5 is delimited, at the top and the bottom, by respective latching projections 4 provided on the holder 26. Each of the latching projections 4 has a rounded latching and support face 28.

FIG. 4 shows the configuration of a retaining device 1 in greater detail. Thus, each retaining device 1 has a C-shaped resilient member 2, and a wedge-shaped member 3. The resilient member 2 is made of a high-strength plastics material of limited elasticity, and the wedge-shaped member 3 is made of a rigid material, in particular a metal, such as a high tensile strength stainless steel. The wedge-shaped member 3 is formed with a pair of shoulders 11 adjacent to its end face 3a. The resilient member 2 has a pair of arms 7 interconnected by a web 29, each arm having a rounded, thickened wall portion 6 adjacent to its free end. The free ends of the arms 7 are formed with inwardly-extending flanges 8. Notches 9 are formed in the resilient member 2 in the regions where the flanges 8 merge with their arms 7.

Once a given coupling member 14 has been positioned in its coupled position, the C-shaped resilient member 2 of associated retaining device 1 is introduced from the side into the associated pocket 5. The wedge-shaped member 3 is then forced into the resilient member 2 by hammer blows applied to its end face 3a. The wedge-shaped member 3 is driven in until the shoulders 11 engage behind the flanges 8 of the arms 7 of the resilient member 2. In this position, the wedge-shaped member 3 is immobilised within the resilient member 2 in a positive manner. The driving-in of the wedge-shaped member 3 opens the resilient member 2 out slightly, so that the rounded thickened wall portions 6 of the resilient member 2 bear against the complementary faces 28 of the latching projections 4, and so that the web 29 bears against the base of the pocket 5. Thus, the retaining device 1 is firmly anchored in the pocket 5. The flat lateral face 30 of the wedge-shaped member 3 that is presented to the coupling member 14 forms a stop face for the head portion 17 of the coupling member. The other lateral face 31 of the wedge-shaped member 3 abuts a stop member 32 which is welded into the base of the pocket 5. Since the wedge-shaped member 3 is somewhat longer than the resilient member 2, the compression forces that occur are taken up exclusively by the wedge-shaped member, so that the resilient member 2 is relieved of all operational forces.

In order to release the connection means, it is first necessary to remove the retaining device 1. This is done by cutting through the resilient member 2 at the notches 9, for example by means of a chisel inserted into the notches from the side. To facilitate this shearing, the resilient member 2 is provided with two internal, rounded notches 10. The notches 10 are machined in the resilient member in the region where the arms 7 merge with their flanges 8. After the resilient member 2 has been sheared, the wedge-shaped member 3, and then the resilient member 2, can be removed from the pocket 5.

FIG. 5 shows a modified form of retaining device 1'. The retaining device 1' has a resilient member 2 and a wedge-shaped member 3' which is similar to the member 3. The main difference between the two forms of wedge-shaped member is that the wedge-shaped member 3' is provided with an additional pair of shoulders 12. The shoulders 12 are integrally formed with the wedge-shaped member 3' towards the narrower, pointed end thereof. With this arrangement, the wedge-shaped member 3' can be driven carefully into the resilient member 2 until the shoulders 12 engage behind the flanges 8 of the resilient member 2 (as shown in FIG. 5). After which, the wedge-shaped member 3' can be driven further into the resilient member 2, without fear of damaging the resilient member, by means of hammer blows.

We claim:

1. In connection means for connecting two components of a mineral mining installation, the connection means comprising an elongate coupling member which is insertible into laterally-open recesses formed in the two components, the laterally-open recesses defining an elongate aperture which is slightly longer than the coupling member so that the coupling member is received within the aperture with a predetermined amount of axial play, and a retaining device for preventing axial movement of the coupling member within the aperture by filling up the space available for said predetermined amount of axial play, the improvement comprising providing the aperture with two latching projections, and forming the retaining device by a C-shaped resilient member and a wedge-shaped member, the resilient member being made of corrosion-resistant resiliently-deformable material and having two symmetrically-positioned thickened wall portions, the retaining device being such that the wedge-shaped member can be driven into the resilient member to expand said thickened wall portions against and behind said latching projections thereby fixing the retaining device in position, and such that the wedge-shaped member is held captive within the resilient member when the retaining device is fixed in position.

2. A retaining device according to claim 1, wherein the resilient member is made of plastics material.

3. A retaining device according to claim 1, wherein the wedge-shaped member is made of metal.

4. A retaining device according to claim 1, wherein the width of the wedge-shaped member is at least as great as the width of the resilient member.

5. A retaining device according to claim 1, wherein the thickened wall portions are rounded.

6. A retaining device according to claim 1, wherein the C-shaped resilient member has a pair of symmetrical arms which tightly embrace the wedge-shaped member when the retaining device is fixed in position.

7. A retaining device according to claim 6, wherein inwardly-extending flanges are formed at the free ends of the arms.

8. A retaining device according to claim 7, wherein notches are formed in the outer surface of the resilient member in the regions where the arms merge with their flanges.

9. A retaining device according to claim 8, wherein said notches are rounded.

10. A retaining device according to claim 7, wherein at least one notch is formed in the inner surface of the resilient member, said at least one notch being formed in a region where one of the arms merges with its flange.

11. A retaining device according to claim 10, wherein said at least one notch is rounded.

12. A retaining device according to claim 7, wherein the thickened wall portions of the resilient member are formed in the arms adjacent to the regions which merge with the flanges.

13. A retaining device according to claim 7, wherein the wider end of the wedge-shaped member has an axially-extending shank which is narrower than said wider end, thereby defining a pair of shoulders which engage behind the flanges of the arms of the resilient member when the retaining device is fixed in position.

14. A retaining device according to claim 7, wherein the wedge-shaped member includes two symmetrically-positioned hook-like latches which extend laterally beyond the tapering edges of the wedge-shaped member.

15. A retaining device according to claim 14, wherein the latches are positioned adjacent to the narrower end of the wedge-shaped member.

16. A retaining device for an elongate coupling member which is insertible into laterally-open recesses formed in two mineral mining installation components to interconnect said components, the laterally-open recesses defining an elongate aperture which is formed with two latching projections and which is slightly longer than the coupling member so that the coupling member is received within the aperture with a predetermined amount of axial play, the retaining device being such as to prevent axial movement of the coupling member within the aperture by filling up the space available for said predetermined amount of axial play, wherein the retaining device comprises a C-shaped resilient member and a wedge-shaped member, the resilient member being made of corrosion-resistant resiliently-deformable material and having two symmetrically-positioned thickened wall portions, the retaining device being such that the wedge-shaped member can be driven into the resilient member to expand said thickened wall portions against and behind said latching projections thereby fixing the retaining device in position, and such that the wedge-shaped member is held captive within the resilient member when the retaining device is fixed in position.

17. Connection means for connecting two channel sections of a scraper-chain conveyor, the connection means comprising an elongate coupling member which is insertible into laterally-open recesses formed in the two components, the laterally-open recesses defining an elongate aperture which is formed with two latching projections and which is slightly longer than the coupling member so that the coupling member is received within the aperture with a predetermined amount of axial play, and a retaining device for preventing axial movement of the coupling member within the aperture by filling up the space available for said predetermined amount of axial play, wherein the retaining device comprises a C-shaped resilient member and a wedge-shaped member, the resilient member being made of corrosion-resistant resiliently-deformable material and having two symmetrically-positioned thickened wall portions, the retaining device being such that the wedge-shaped member can be driven into the resilient member to expand said thickened wall portions against and behind said latching projections thereby fixing the retaining device in position, and such that the wedge-shaped member is held captive within the resilient member when the retaining device is fixed in position.

18. A scraper-chain conveyor comprising a plurality of channel sections joined together end-to-end, each of the channel sections having a pair of side walls joined together by a floor plate, each pair of adjacent side walls being interconnected by a respective connection means, each connection means comprising an elongate coupling member which is insertible into laterally-open recesses formed in two coupling elements welded to the associated pair of adjacent side walls, the laterally-open recesses defining an elongate aperture which is formed with two latching projections and which is slightly longer than the coupling member so that the coupling member is received within the aperture with a predetermined amount of axial play, and a retaining device for preventing axial movement of the coupling member within the aperture by filling up the space available for said predetermined amount of axial play, wherein the retaining device comprises a C-shaped resilient member and a wedge-shaped member, the resilient member being made of corrosion-resistant resiliently-deformable material and having two symmetrically-positioned thickened wall portions, the retaining device being such that the wedge-shaped member can be driven into the resilient member to expand said thickened wall portions against and behind said latching projections thereby fixing the retaining device in position, and such that the wedge-shaped member is held captive within the resilient member when the retaining device is fixed in position.

* * * * *